United States Patent

[11] 3,587,335

| [72] | Inventor | Bradford Howland<br>Cambridge, Mass. |
|---|---|---|
| [21] | Appl. No. | 815,038 |
| [22] | Filed | Apr. 10, 1969 |
| [45] | Patented | June 28, 1971 |
| [73] | Assignee | Massachusetts Institute of Technology,<br>Cambridge, Mass. |

[54] DEVICE FOR PROVIDING PRECISE MOTIONS
11 Claims, 16 Drawing Figs.

[52] U.S. Cl. ............................................. 74/89.15
[51] Int. Cl. .............................................. F16h 27/02
[50] Field of Search ................................. 74/89.15,
424.8, 99, 25; 308/200

[56] References Cited
UNITED STATES PATENTS

| 2,221,512 | 11/1940 | Foley | 308/200 |
| 3,018,665 | 1/1962 | Christoff | 74/99 |
| 3,036,281 | 5/1962 | Hilliard | 74/89.15 |
| 2,780,740 | 2/1957 | Roman et al. | 74/424.8 |
| 3,402,613 | 9/1968 | Neusel et al. | 74/89.15 |

Primary Examiner—Fred C. Mattern, Jr.
Assistant Examiner—Wesley S. Ratliff, Jr.
Attorneys—Thomas Cooch, Martin M. Santa and Robert Shaw

ABSTRACT: A tilt table capable of precise angular motion in response to the movement of a micrometer screw is described. The micrometer screw is in contact with an end ball of a juxtaposed multiplicity of spherical balls in opposed "v" shaped races. One end of the races is constrained by a pivot so that the movement apart of the races is angular with respect to each other. At the pivot end, the other end ball of the multiplicity of balls is mechanically constrained from moving along the race. Therefore, the movement of the screw against the ball farthest from the pivot causes the balls to force the races angularly apart. Precision following of the angle with respect to the movement of the micrometer screw is obtained by causing the micrometer screw to impart simultaneous rotational and longitudinal movement of the ball with which it makes contact. This device is modified to produce precise pure lateral motion of a member with respect to another by linking the members and using a plurality of ball races.

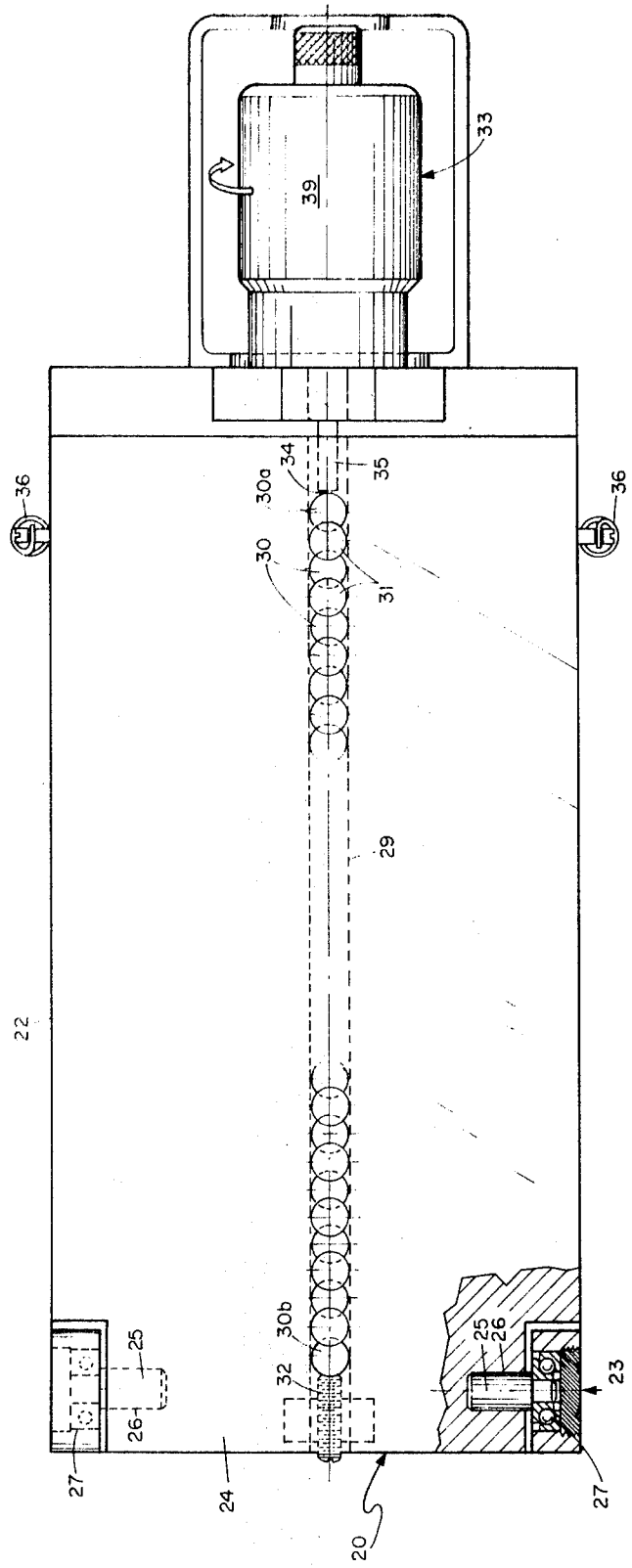
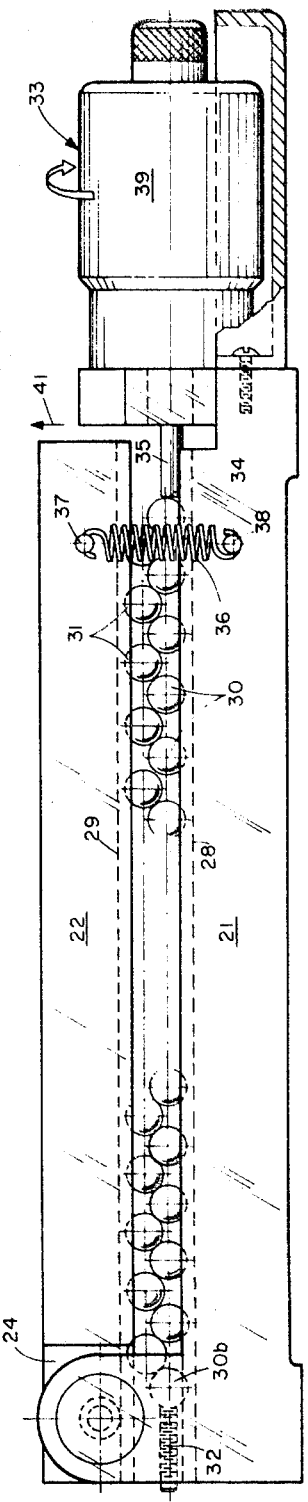
FIG. 1
FIG. 2
INVENTOR:
BRADFORD HOWLAND

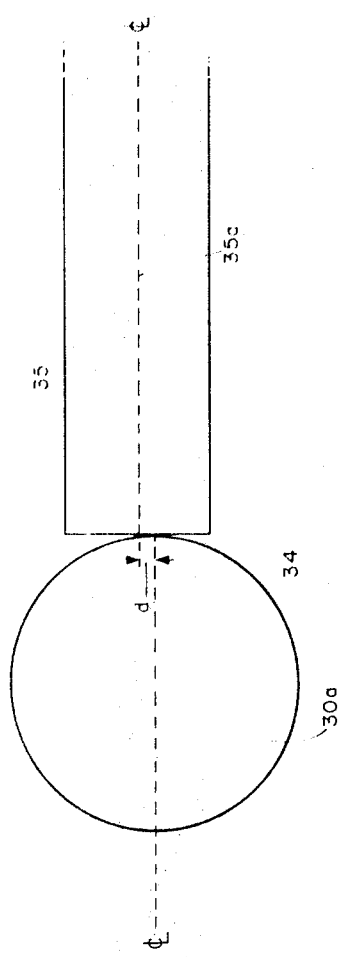
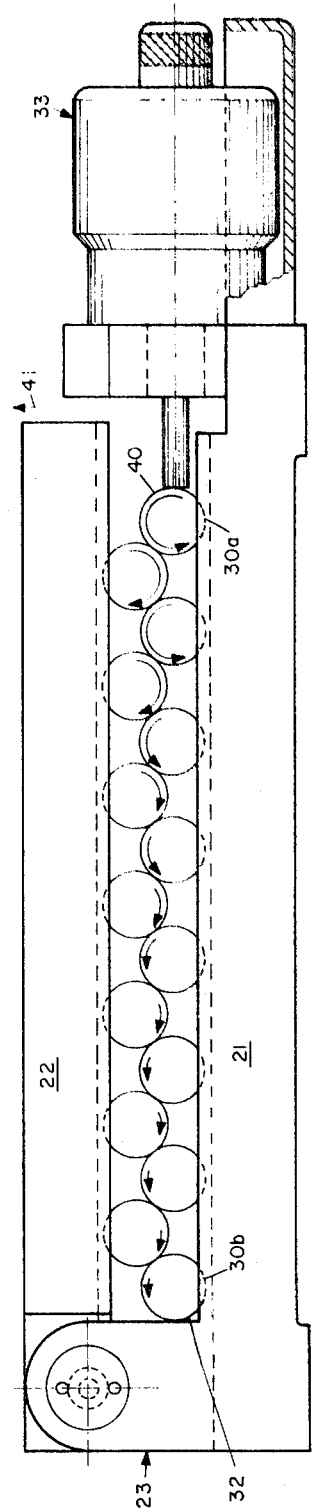
FIG. 3
FIG. 4
INVENTOR:
BRADFORD HOWLAND

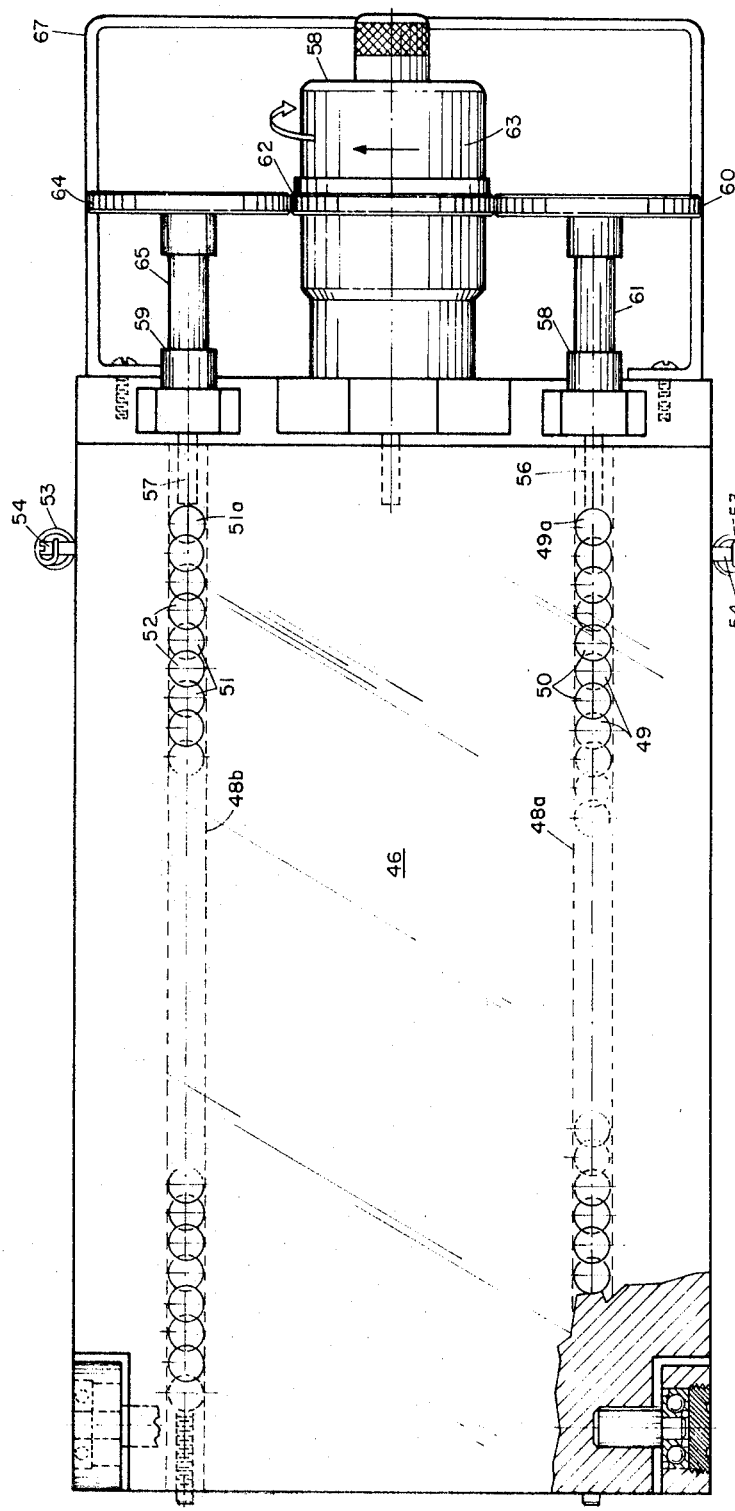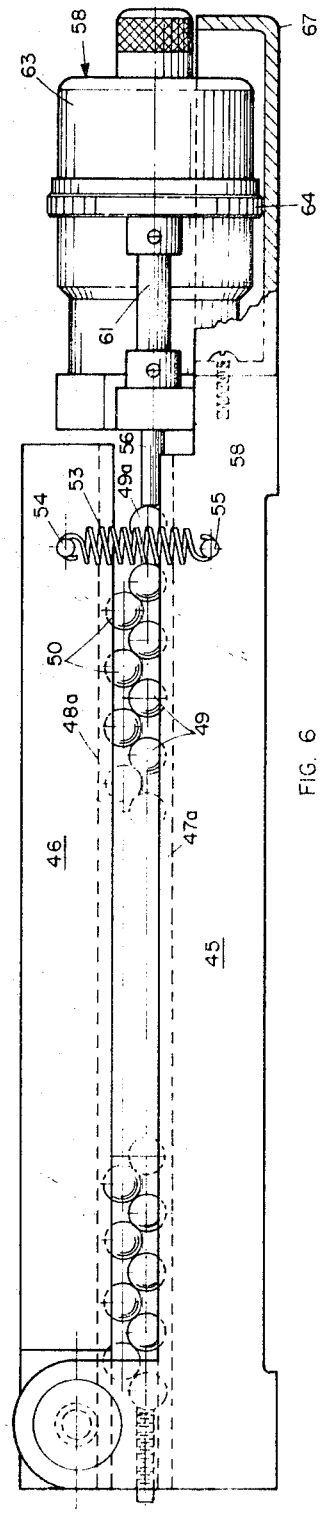

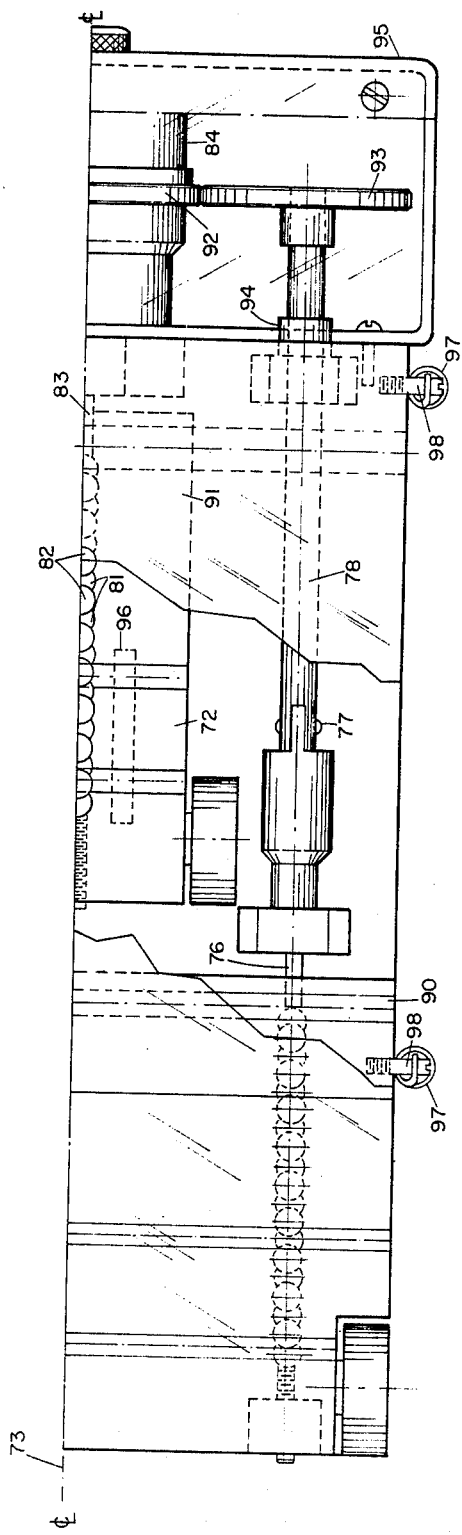
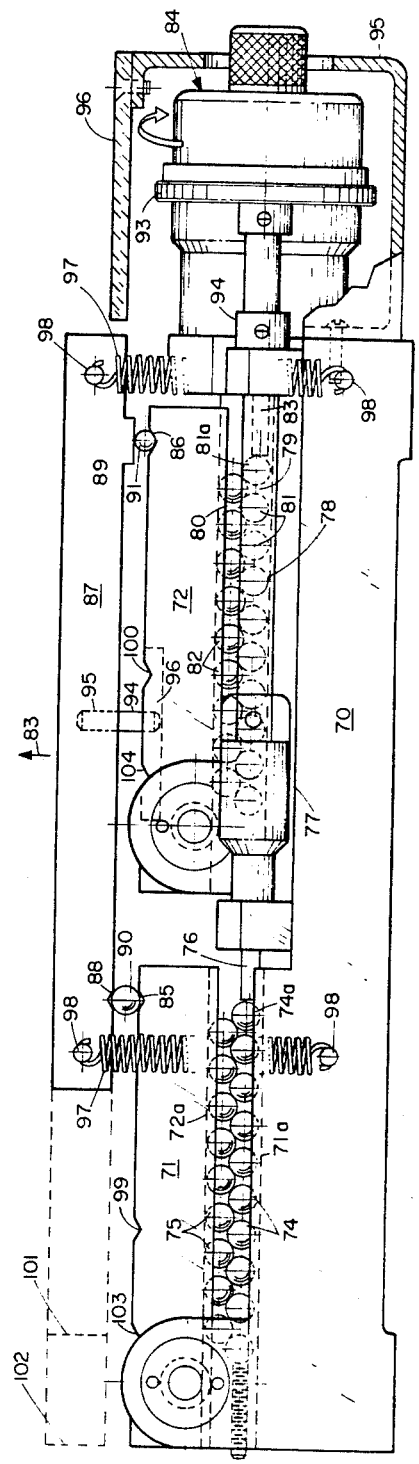
FIG. 7
FIG. 8
INVENTOR
BRADFORD HOWLAND

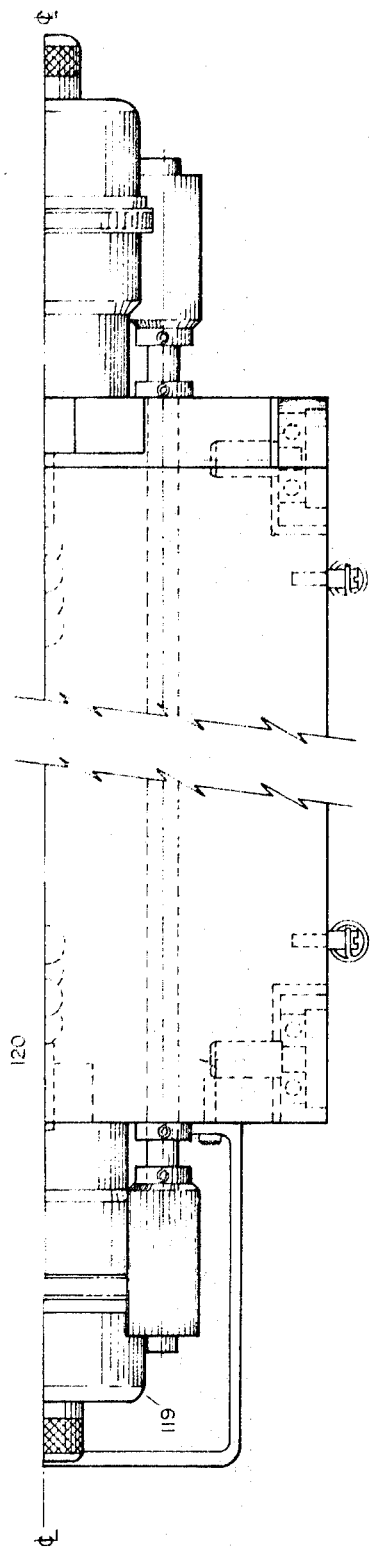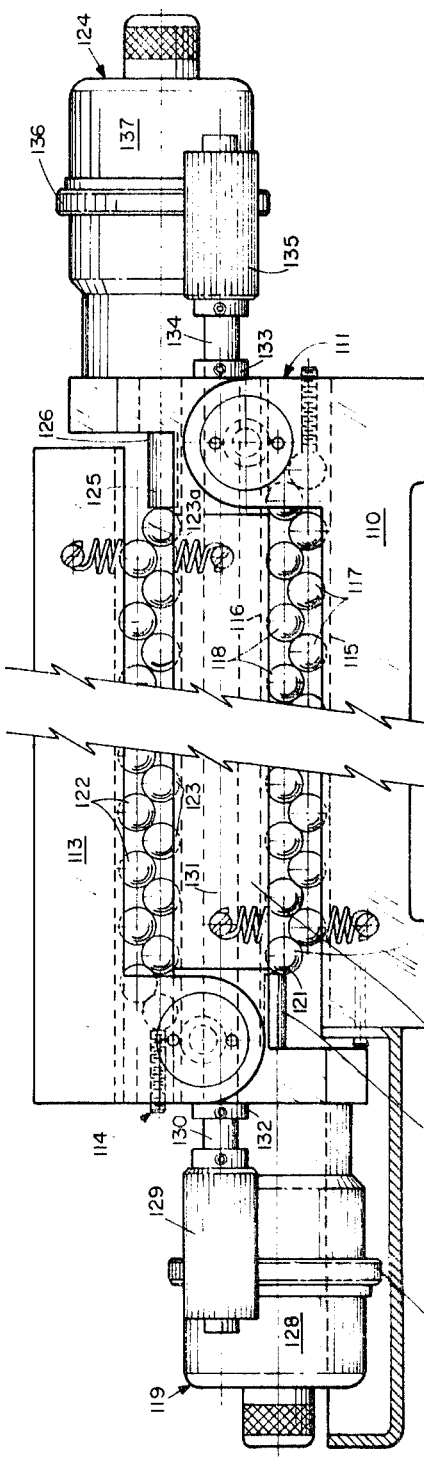
FIG. 9
FIG. 10
INVENTOR:
BRADFORD HOWLAND

INVENTOR:
BRADFORD HOWLAND

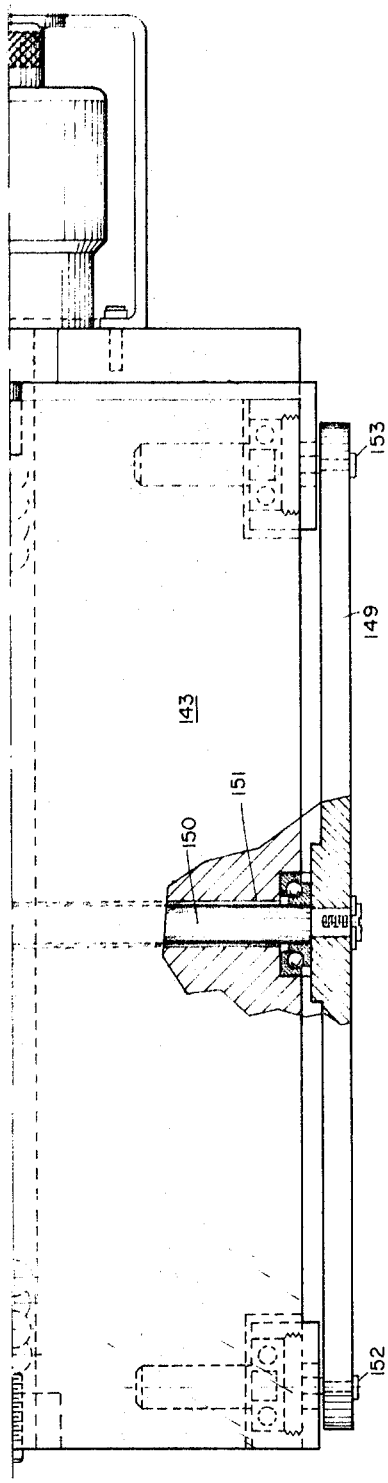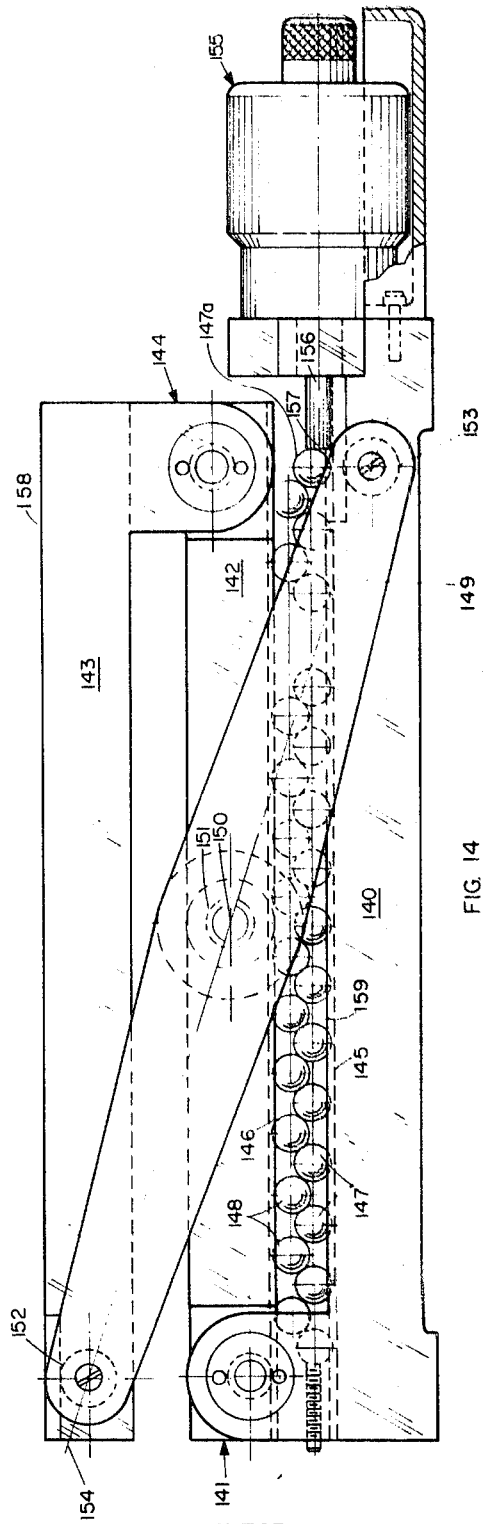
FIG. 13
FIG. 14
INVENTOR:
BRADFORD HOWLAND

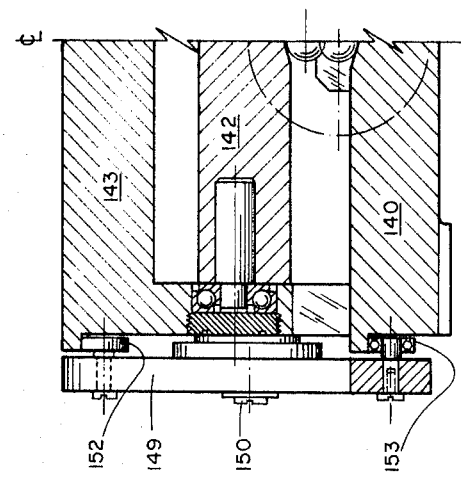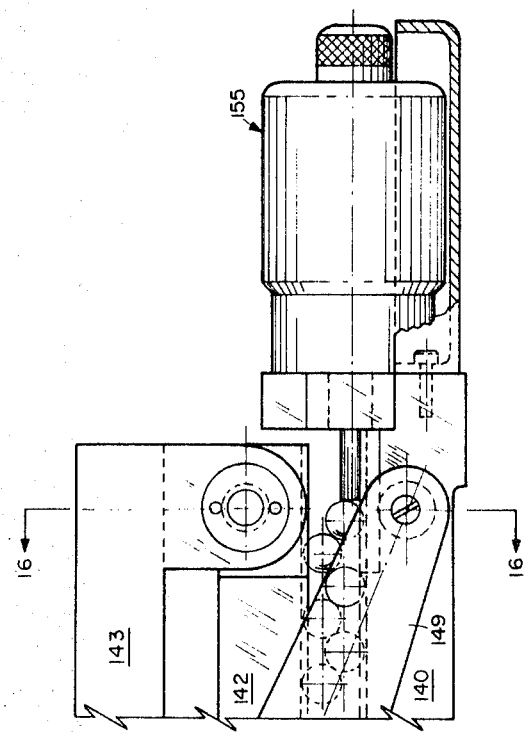
INVENTOR:
BRADFORD HOWLAND

DEVICE FOR PROVIDING PRECISE MOTIONS

This invention relates generally to devices for precisely moving a first member relative to a second member and, more particularly, to such devices for use in precision measuring instruments wherein such members move in either translational or angular relationships to each other.

Precision measuring devices must be substantially free from deflections when subjected to ordinary loads and must be completely resistant to permanent deformations even when subjected to occasional overloads.

Precision tilt tables, for example, have a movable member which is pivotally mounted to one end of a fixedly mounted member so as to provide angular movement with respect thereto. The surface of the movable member carriers an appropriate load, such as a telescope, which is required to be moved at a precisely measurable angle. In an effort to produce such precisely measured motion, prior art devices have used various combinations of levers, fulcrums, reeds or other precisely formed parts actuated by micrometer screws, for example, which are often mounted in complex configurations which may be difficult to assemble and maintain in proper working condition. Such devices, moreover, are often prone to temporary or permanent deformations and many are not easily adaptable for use with loads relatively large in size or weight. Moreover, the friction problems arising with prolonged use of such devices cause them to wear excessively so as to impair their accuracy.

This invention provides for an extremely accurate movement of a displacable member and can be constructed to handle relatively large loads, such loads being nearly evenly distributed over the load-bearing surface of the movable member. Moreover, devices made in accordance with the invention utilize standard and readily available parts, a construction which minimizes the need for precise machining or its elements or for the use of complex mounting methods and structures as found in prior art devices. Spatial requirements for devices made in accordance with the invention are also relatively small since the invention is capable of being designed in a compact form which also aids in producing the desired rigidity of structure for avoiding unwarranted deformations, either temporary or permanent. Moreover, the structure of the invention substantially reduces the friction normally encountered in precision mechanical devices, and hence, the wearing capabilities of the device are improved considerably and continued accuracy is maintained even over long periods of use.

Broadly, the device of the invention includes a first set of rolling surfaces, preferably in the form of solid spheres, the surfaces of which are arranged to contact a fixedly mounted member. A second set of such spheres is also utilized to contact both the movable member and the first set of spheres. An appropriate means, such as the shaft of a micrometer screw, is used to impart a rolling motion to at least one sphere in at least one of the sets of spheres so as to cause each of the spheres in both sets to move generally in accordance with a rolling motion, with a minimum of sliding motion, so as to move, in turn, the movable member relative to the fixedly mounted member.

The structure and operation of particular alternative embodiments of the invention in accordance with the above principles of operation can be described most easily with reference to the accompanying drawings wherein:

FIG. 1 depicts a plan view of a precision tilt table representing one specific embodiment of the invention;

FIG. 2 depicts a side elevational view of the precision tilt table of FIG. 1;

FIG. 3 depicts a diagrammatic view of an enlargement of a portion of the precision tilt table shown in FIG. 1;

FIG. 4 depicts another side elevational view in simplified diagrammatic form of the precision tilt table of FIG. 1 in a different stage of its operation;

FIG. 5 depicts a plan view of an alternative embodiment of the precision tilt table of the invention;

FIG. 6 depicts a side, elevational view of the precision tilt table of FIG. 5;

FIG. 7 depicts a partial plan view of a symmetrical half of another alternative embodiment of the invention for moving a member in accordance with a translational motion relative to a nonmovable member;

FIG. 8 depicts a side, elevational view of the embodiment of the invention shown in FIG. 7;

FIG. 9 depicts a partial plan view of a symmetrical half of another alternative embodiment of the invention for moving a member in accordance with a translational motion relative to a nonmovable member;

FIG. 10 depicts a side, elevational view of the embodiment of the invention shown in FIG. 9;

FIG. 13 depicts a partial plan view of a symmetrical half of another alternative embodiment of the invention for moving a member in accordance with a translational motion relative to a nonmovable member;

FIG. 14 depicts a side, elevational view of the embodiment of the invention shown in FIG. 13;

FIG. 15 depicts a more detailed side, elevational view of a portion of the embodiment of the invention shown in FIGS. 13 and 14; and FIG. 16 depicts a partial and elevational view in cross section taken along the line 16–16 of FIG. 15.

Figure 12:
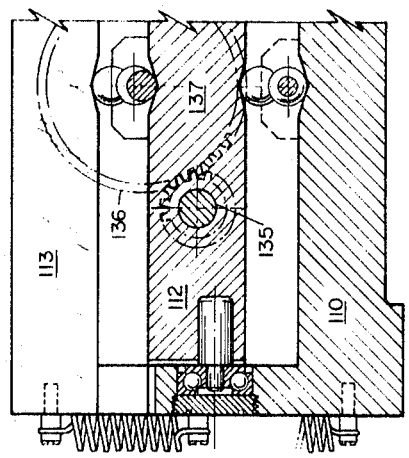
FIG. 12 depicts a partial end elevational view in cross section taken along line 12–12 of FIG. 11.

In FIGS. 1 and 2 a tilt table 20 has a fixed base member 21 and a movable member 22 which is pivotally mounted at inner end 23 of the device so as to be capable of angular displacement relative to base member 21. Movable member 22, for example, has a projection 24 having a pair of openings 26 at each end into which a pair of steel shafts 25 are inserted. Shafts 25 are in turn appropriately journaled in a pair of conventional ball bearing assemblies 27 mounted at either side of projection 24 at the inner end of the device. Alternatively, movable member 22 may be mounted in other appropriate pivot structures which may utilize, for example, well-known flexural linkages or cross-reed pivot elements.

In the particular embodiment shown, base member 21 has a V-shaped race 28 located in its upper surface substantially along the longitudinal center line thereof while movable member 22 has a V-shaped race 29 similarly located in the bottom surface thereof and oppositely disposed with reference to V-shaped race 28. A first, or lower, set of solid spheres 30 are positioned adjacent one another in race 28 and a second, or upper, set of adjacent solid spheres 31 are positioned in race 29, each of spheres 31 being located intermediate and in contact with two adjacent spheres 30 so that along the longitudinal axis of the device the upper and lower spheres are alternatively positioned as shown in FIGS. 1 and 2. A stop member 32 is fixedly mounted at the inner, or hinged, end 23 of tilt table 20 in contact with the inner endmost sphere, designated as sphere 30b, to prevent any longitudinal motion beyond the stop point.

A micrometer screw 33 is mounted at the opposite, or outer, end of the device so that the substantially planar end surface 34 of its projecting shaft 35 is in contact with the outer endmost sphere, designated as sphere 30a, in the first, or lower, set of said spheres. In the enlarged illustration shown in FIG. 3, the longitudinal axis 35a of the micrometer shaft (looking downward at the top thereof) is displaced laterally from the centerline by an appropriate distance "d" to insure suitable rolling contact between the planar end surface 34 to micrometer shaft 35 and the surface of sphere 30a. The distance "d" is preferably made equal to the pitch of the micrometer screw divided by $2\theta$ to insure substantially correct rolling motion. Thus, for a micrometer screw pitch of 25.0 mils, for example, the distance "d" is approximately 4.0 mils.

A pair of spring members 36 are located at opposite sides of the device, one end of each spring member being anchored to a projecting lug 37 attached to movable member 22 and the other end of each such spring member being anchored to a projecting lug 38 attached to fixed member 21. Thus, members 21 and 22 are appropriately held together to prevent the escape of spheres 30 and 31.

As the head 39 of micrometer screw 33 is rotated clockwise in the direction shown by its associated arrow, shaft 35 moves in a longitudinal direction along the axis of the screw and its end surface 34 imparts a rolling motion to sphere 30a in the direction as shown by arrow 40 in FIG. 4. FIG. 4 is a simplified diagrammatic view of the type of device shown in FIGS. 1 and 2. For such simplicity portions of the device in FIG. 4 are shown somewhat enlarged and the device has a fewer number of spheres than that shown in the previous FIGS. The rolling action of sphere 30a consequently imparts similar rotating motions to the remaining spheres of both upper and lower sets of spheres in the directions shown by the remaining unnumbered arrows associated with each sphere in FIG. 4. Thus, each of the spheres tends to roll toward the pivot end 23 of the device within races 28 and 29 between the inner surfaces of members 21 and 22. As a result, the upper member 22 becomes angularly displaced, or tilted, upwardly with reference to the base member 21 in a direction shown by arrow 41.

A measurement of such angular displacement of movable member 22 is then appropriately designated in accordance with the micrometer screw graduation marks (not shown). It has been found that the response of the device tends to be nonlinear, that is, the angular displacement of movable member 22 does not bear a linear relationship with respect to the angular displacement of the micrometer screw. The effects of such nonlinearity, however, can be relatively easily compensated for by providing a suitable nonlinear graduated scale on the micrometer screw providing the operator with an accurate indication of the motion which takes place.

The lengths of arrow 40 and of the remaining unnumbered arrows associated with each of the spheres as shown in FIG. 4 represent the approximate relative degree of rotation of each of the spheres and, as can be seen, the spheres closer to the pivot end 23 of the device rotate progressively lesser amounts than those nearer to the micrometer or outer end of the device. At the stop member 32 substantially little or no motion of inner endmost sphere 30b occurs.

The device shown has relatively large load bearing capabilities since the load is nearly evenly distributed over a plurality of contacts. The device is capable of operation with very large reduction ratios, that is, the ratio of the number of turns, or angular displacement, or micrometer screw 33 relative to the angular displacement of movable member 22 is extremely large. Such ratio increases with an increase in the total number of spheres utilized in the device. In addition, the device uses only standard parts, that is, the spheres, micrometer screw, pivot bearings, and other structural elements are conventional and readily available. Moreover, the machining required for the device is relatively simple, the races being easily machined without the need for the excessive care and precision required in prior art devices.

The device can be compactly designed and can be made to occupy a smaller volume than a corresponding arrangement of levered devices for producing comparable sensitivity and rigidity. Because the motion of the spheres is a rolling one, with a minimum of sliding motion, friction in the overall operation is held to a minimum and wear on the parts is relatively inconsequential. The major area where friction appears to be a factor occurs in the operation of the micrometer screw rather than at the spheres themselves.

Thus, the device described with reference to FIGS. 1—4 provides a precision tilt table for producing extremely accurate and repeatable measurements of the angular motion of member 22. Such a device is useful in many applications, for example, in precision optical measuring systems as used in surveying and precision leveling.

An alternate embodiment of the tilt table construction discussed in FIGS. 1—4 is shown in FIGS. 5 and 6 wherein a base member 45 is pivotally connected to an angularly movable member 46 which is thereupon appropriately pivoted by shaft and ball bearing assemblies of substantially the same type as that shown in FIGS. 1 and 2. A pair of V-shaped races (only one of which, 47a, is shown in FIG. 6) are located in base member 45 and a similar pair of V-shaped races 48a and 48b are located in movable member 46 so as to be oppositely disposed respectively, with reference to the races located in lower member 45. The upper and lower pairs of ball races are laterally offset at either side of the centerline of members 45 and 46 as shown and have positioned within them a first pair of sets 49 and 50 and a second pair of sets 51 and 52, respectively, of adjacent spheres in the same manner as shown in FIGS. 1 and 2. Such a configuration increases the number of contact points and consequently increases the load-bearing capacity and stability of the overall tilt table configuration.

As discussed above with reference to FIGS. 1—4, a pair of spring members 53 are suitably attached to members 45 and 46 through appropriate lugs 54 and 55 so as to hold members 45 and 46 together and prevent the escape of spheres 49, 50, 51 and 52.

During operation, the outer endmost spheres 49a and 51a associated with the lower races are in contact with the planar end surfaces of a pair of left-hand thread micrometer screw shafts 56 and 57, associated with a right-hand thread micrometer screw, 58. Micrometer screw 58 is arranged so that movement of the micrometer head 63 in a clockwise direction, as shown by the arrow associated with it, causes the micrometer screw shafts 56 and 57 to move inwardly toward spheres 49a and 51a, respectively, as discussed below.

The operation of such shafts is coordinated by an appropriate gear mechanism so that identical rolling motions are imparted to the outer endmost spheres of sets 49 and 51 simultaneously. A first gear 60 is peripherally mounted on a shaft extension 61 of shaft 56 and meshes with a second gear 62 peripherally mounted on a rotating head 63 of micrometer screw 58. A third gear 64 peripherally mounted on a shaft extension 65 of shaft 57 also meshes with gear 62. Thus, when the centrally located micrometer screw 58 is rotated in a clockwise direction, as shown by the arrow associated therewith, gears 62 and 64 rotate in a counterclockwise direction so that shafts 56 and 57 move inwardly to raise movable member 46 accordingly. An appropriate graduated scale on micrometer screw 63 is used to indicate the amount of motion imparted to movable member 46. A portion of the assembly of gears and micrometer screw may be suitably encased in an enclosure 67 as shown.

It is understood that, if desired, the concept shown in FIGS. 5 and 6 may be extended to utilize more than two sets of oppositely disposed combinations of races and spheres with appropriate actuation thereof being supplied by a suitable combination of screw and gearing as required to produce the simultaneous and identical rolling motions desired.

The basic concept of the invention, discussed above with reference to tilt table constructions, is also useful for providing translational movement of a movable member relative to a fixed member, the surfaces of each member always being maintained everywhere substantially parallel during such motion.

One embodiment of such a structure is shown with reference to FIGS. 7 and 8 wherein a fixed base member 70 has a first intermediate movable member 71 and a second intermediate movable member 72, both pivotally mounted thereon. First movable member 71 is mounted near the left end of base member 70, as sown in the FIGS., the pivotal motion being supplied via appropriate shaft and bearing assemblies, in a manner similar to that discussed with reference to similar pivot members in the previous FIGS. Base member 70 has a pair of V-shaped races (only one of which, 71a, is shown in the FIGS.) located in its upper surface and movable member 71 has a pair of V-shaped races (only one of which, 72a, is shown in the FIGS.) located in its lower surface and oppositely disposed with reference to the races in fixed member 70. Such upper and lower races are suitable laterally offset at either side of the centerline 73 of members 70 and 71, in a manner similar to that sown above with reference to FIGS. 5 and 6. Such races have positioned within them a first pair of sets 74 and 75 of adjacent spheres in races 71a and 72a, respectively, and a similar second pair of sets of adjacent spheres in the corresponding races on the opposite side of centerline 73, in a manner similar to that shown in the previous FIGS. The outer endmost spheres of the lower sets thereof (e.g. sphere 74a associated with lower races 71a) are in contact with the planar end surface of a pair of left-hand thread micrometer screw shafts (only one of which, shaft 76, is shown in the FIGS.-A similar shaft assembly being correspondingly mounted with reference to the second sphere and race combination on the opposite side of centerline 73).

An inward motion of shaft 76 and the corresponding shaft on the opposite side of centerline 73 causes movable member 71 to be tilted angularly upwardly with respect to fixed member 70, again in a manner similar to that discussed above with reference to the previous FIGS. The movement of such shafts is coordinated with the operation of a right-hand thread micrometer screw 84 as discussed in more detail below.

A second intermediate movable member 72 is pivotally mounted near the central portion of fixed member 70 as sown, the width of member 72 being substantially less than that of member 71 and member 72 being located in the space between a coupling element 77 and a shaft extension 78 on one side of centerline 73, and a corresponding coupling element and shaft extension on the opposite side of centerline 73. Member 72 is likewise pivotally mounted by appropriate shaft and bearing assemblies so as to move with an angular motion relative to fixed member 70. Fixed member 70 has a V-shaped race 79 located in its upper surface substantially along its centerline, the length thereof being substantially coextensive with the length of movable member 72. Member 72 has a corresponding V-shaped race 80 located in its lower surface substantially along its centerline and oppositely disposed with respect to race 79. A first set of spheres 81 is mounted in race 79 and a second set of spheres 82 is mounted in race 80 adjacent thereto in a manner similar to that described above with reference to previous FIGS. The outer endmost sphere of set 81a in race 79 is in contact with the planar end of a shaft 83 of a micrometer screw 84 so that, as shaft 83 moves inwardly, movable member 72 is caused to tilt upwardly with reference to fixed member 70 in a manner similar to that discussed above with reference to movable member 71.

Another V-shaped race 85 is located in the upper surface of movable member 71, race 85 lying along a line in a lateral direction across member 71 as shown Another V-shaped race 86 is also located in the upper surface of movable member 72, such race 86 also lying along a line in a lateral direction across member 72 as shown. A third movable member 87 has a V-shaped race 88 located in the lower surface thereof, such race 88 lying along a line in a lateral direction near one end thereof and a rectangular projection 89 located in the lower surface thereof, projection 89 also lying along a line in a lateral direction near the other end thereof. Race 88 and projection 89 are arranged to be oppositely disposed with reference to races 85 and 86, respectively. A first rod 90 is inserted between oppositely disposed races 85 and 88 and a second rod 91 is inserted between race 86 and the lower surface of projection 89. Thus, movable member 87 is caused to rest on rods 90 and 91.

Micrometer screw 84 mounted at the right-hand end of the structure as shown has a gear 92 peripherally mounted thereon, which gear meshes at either side thereof with a gear 93 and a corresponding gear (not shown) on the opposite side of the centerline 73. Gear 93 is mounted at one end of shaft extension 78, the other end of which is suitable coupled to shaft 76 via coupling element 77, shaft 78 being appropriately journaled in a bearing member 94. A similar gear, shaft extension, bearing member and coupling element is located on the opposite side of centerline 73. The overall gear assembly, micrometer screw 84 and outer portions of the connecting shaft extensions discussed above are encased in a suitable enclosure 95 and has a transparent top 96 formed of Plexiglas, for example.

In a manner similar to that discussed above with reference to FIGS. 1—6, a plurality of spring members 97 are suitable attached at either side of the device to movable member 87 and fixed member 70 via appropriate lugs 98 as shown. Thus, the overall device is appropriately held together to prevent the escape of the various spheres utilized therein. In addition a dowel pin 94 is inserted in a first cylindrical opening 95 at the bottom of member 87 and a second slotted opening 96 of movable member 72 to maintain lateral stability of the overall device.

If micrometer screw 84 is rotated in a clockwise direction as shown by its associated arrow, its shaft 83 moves inwardly to cause movable member 72 to be angularly moved upwardly with reference to fixed member 70. Simultaneously therewith, the rotation of micrometer screw 84 and gear 92 causes a counterclockwise rotation of gear 93 and its counterpart of the opposite side of centerline 73 which motions are imparted through the appropriate connecting shafts, extensions and coupling elements to oppositely threaded micrometer shaft 76 and its counterpart on the opposite side of centerline 73 so that such micrometer shafts move inwardly and movable member 71 is thereby caused to be angularly moved upwardly with reference to fixed member 70. The simultaneous motions of movable members 71 and 72 are identical and thereby cause top movable member 87 to be raised upwardly in a translational movement as shown by arrow 83 so that its upper surface moves everywhere in a direction that is parallel to fixed member 70.

The reduction ratio, that is, the ratio of the number of turns (i.e., the angular displacement) of the micrometer screw involved relative to the angular displacements of movable members 71 and 72 (and, consequently, the translational displacement of movable member 87) may be varied in accordance with the location of movable member 87 relative to movable members 71 and 72. In order to increase the reduction ratio, race 88 and projection 89 alternatively may be oppositely disposed with reference to a second V-shaped race 99 in member 71 (located along a line in a lateral direction to the left of race 85) and a second V-shaped race 100 in member 72 (located along a line in a lateral direction to the left of race 86), respectively. The distance between races 85 and 99 is the same as that between races 86 and 100 when member is so located it assumes the position shown by dashed line 101.

Similarly, the reduction ratio can be made even larger by placing movable member 87 even further to the left as shown in the FIG. by dashed line 102 so that its race 88 and projection 89 are oppositely disposed to still a third V-shaped race 103 in member 71 (located along a line in a lateral direction to the left of race 99) and a third V-shaped race 104 in member 72 (located along a line in a lateral direction to the left of race 100), respectively. As shown the placement of races 99 and 100 relative to races 85 and 86 is arranged to provide an increase in the reduction ration of approximately three times that provided by the use of races 85 and 86, while the placement of races 103 and 104 is arranged to increase the reduction ratio by approximately 10 times that obtained by the use of races 85 and 86.

As discussed above with reference to the tilt table constructions of FIGS. 1—6, the structure of FIGS. 7 and 8 also provides good load bearing capacity and again the construction makes use only of conventional parts which are readily available.

Figure 11:
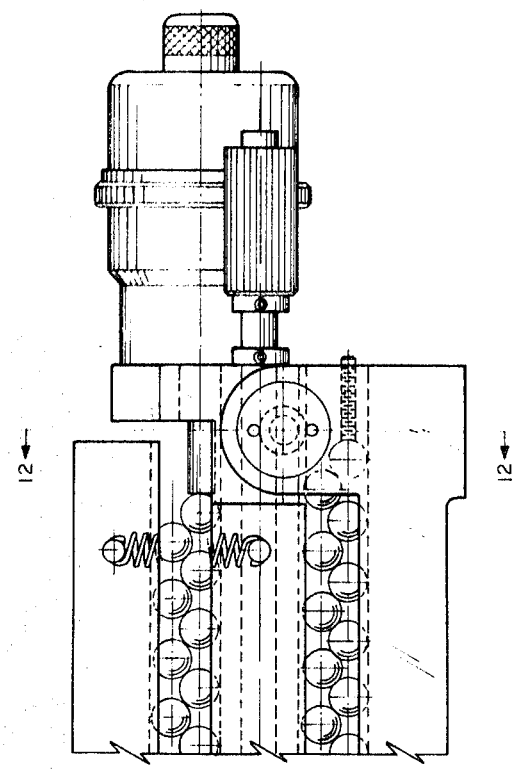
FIG. 11 depicts a more detailed side, elevational view of a portion of the embodiment of the invention shown in FIGS. 9 and 10.

Although the structure shown in FIGS. 7 and 8 is deemed to be a preferably embodiment for providing accurate translational motion in accordance with the principles of the invention, other alternative embodiments are available. Two such alternative embodiments are shown in FIGS. 9—16.

The embodiment shown in FIGS. 9—12 depicts a first base member 110 which has an intermediate member 112 pivotally connected thereto at the right end 111 shown. A first and a second set of spheres 117 and 118 are located in appropriate V-shaped race ways 115 and 116 in base member 110 and intermediate member 112, respectively, in a manner similar to that discussed above in previous FIGS. A micrometer having left-hand thread 119 is located at the left end of base member 110 as shown. Thus, intermediate member 112 is caused to move angularly with reference to base member 110 as the shaft 120 of micrometer 119 is moved inwardly and its planar end 121 contacts the upper endmost sphere 118a as shown.

An upper movable member 113 is hingedly connected to intermediate member 112, at left end 114 as sown. Intermediate member 112 and upper member 113, thus, form a second operating combination of members relatively movable with respect to each other, such combination being essentially mechanically parallel to the first operating combination of members 110 and 112. A third and fourth plurality of spheres 122 and 123 are mounted in appropriate V-shaped raceways in upper member 113 and intermediate member 112, respectively. A second micrometer having right-hand thread 124 is appropriately mounted at the right end opposite to that at which micrometer 119 is mounted so that the planar end 125 of its shaft 126 contacts lower endmost sphere 123a.

Thus, as shaft 120 and shaft 126 move inwardly, an angular motion of intermediate movable member 112 relative to base member 110 and an angular motion of upper movable member 113 relative to intermediate member 112 occurs. Such operation thereby imparts to upper member 113 a translation motion relative to base member 110, member 113 moving substantially parallel to base member 125 as required.

In order to insure that micrometers 119 and 124 operate synchronously in appropriate directions so as to cause their shafts to move inwardly at the same rate, such micrometers are suitable mechanically ganged. For this purpose, for example, a first gear 127 is peripherally mounted on the rotating body portion 128 of micrometer 119, and is caused to mesh with a spline 129 having an extension shaft 130 coupled to an intermediate shaft 131 via universal joint 133 to an extension shaft 135 of a spline 135 which in turn appropriately meshed with a gear 136 peripherally mounted on the rotating body portion 137 of micrometer 124. Thus, as micrometer body portion 128 is rotated to cause shaft 120 thereof to move inwardly against sphere 118a, rotating body portion 137 of micrometer 124 corresponding rotates so as to cause shaft 126 to move inwardly against sphere 123a. Accordingly, the desired synchronous operation of the micrometers produces the translational motion of upper movable member 113 as required.

As discussed above with reference to the embodiment of FIGS. 7 and 8, the structure of FIGS. 9—12 also provides good load-bearing capacity and such construction makes use only of conventional parts which are readily available.

A still further embodiment for providing translational motion is shown in FIGS. 13—16 and depicts a combination of two movable members angularly movable relative to each other, one being angularly movable relative to a third fixed member and the other moving parallel to the third member so that an overall translational motion of said other movable member is produced. As seen in the FIG., a lower base member 140 has pivotally mounted at one end 141 thereof an intermediate movable member 142. An upper movable member 143 is similarly pivotally mounted at the other end 144 of intermediate member 142. In the particular embodiment shown, V-shaped races 145 and 146 are located substantially along the centerlines of members 140 and 142, respectively, and, accordingly, suitable sets 147 and 148 of adjacent spheres are positioned, respectively, within such races.

A pair of lever arms 149 (only one of which is shown in the FIGS.) are mounted at opposite ends of a shaft 150 extending through a transverse opening 151 substantially centrally located in intermediate member 142. The ends of lever arm 149 (and the corresponding lever arm of the other side of the device), are coupled to opposite ends of upper member 143 and lower base member 140 via cam-follower ball bearing assemblies 152 and 153, respectively. The axes of cam-follower bearing assemblies 152 and 153 and shaft 150 are parallel and lie in substantially the same plane as shown so that their ends, as seen in the FIG., lie on a line designated by line 154.

A micrometer screw 155 having a shaft 156 is mounted at one end of base member 140, the planar end 157 of shaft 156 being in contact with outer endmost sphere 147a so as to impart a rolling motion to spheres 147 and 148 in a manner similar to that discussed above with reference to the previous FIGS.

The rolling motions of spheres 147 and 148 causes an angular displacement of intermediate member 142 relative to base member 140. As member 142 moves, thusly, lever arms 149 (and its counterpart on the opposite side of the device) and shaft 150 cause a corresponding displacement of upper member 143 which displacement is everywhere in a direction substantially perpendicular to base member 140 so that in effect a translation motion of upper surface 158 of member 143 relative to upper surface 159 of base member 140 occurs, surface 158 remaining at all times parallel to surface 159.

I claim:
1. A tilt table comprising
   a first base member having an inner and outer end,
   a second movable member pivotally mounted to the inner end of said base member for angular movement with one degree of freedom relative thereto;
   a first race located in said base member;
   a second race located in said movable member;
   a first set of spheres positioned within said first race;
   a second set of spheres positioned within said second race, the surfaces of said second set of spheres being arranged to maintain contact with the surfaces of said first set of spheres;
   a stop member located at said pivot end in contact with the inner endmost sphere of said first set of spheres located at said pivot end;
   means for imparting a positive rolling motion along said race and simultaneous translation along said race to the endmost sphere of said first set located at the outer end of said base member to cause said movable member to move angularly relative to said base member; and
   said rolling motion imparting means being a micrometer screw having a shaft with a substantially planar end, said planar end of said shaft being mounted to contact said outer endmost sphere of said first set of spheres for imparting said rolling motion thereto.

2. A tilt table in accordance with claim 1 wherein said races and said spheres are located substantially along the centerline of said base member and said movable member, respectively; and
   said planar end of said micrometer screw contacts the surface of said outer endmost sphere along said centerline, the centerline of said micrometer screw being laterally offset from the said centerline of said members.

3. A tilt table in accordance with claim 1 and further including
   a third race located in said base member and a third set of spheres positioned therein;
   a fourth race located in said movable member and a fourth set of spheres positioned therein, said fourth set of spheres being oppositely disposed to said third set of spheres and in contact therewith;
   said first and second races and said first and second sets of spheres therein being laterally offset in a first direction from the centerlines of said base member and said movable member, respectively; and
   said third and fourth races and said third and fourth sets of spheres therein being laterally offset in a second direction opposite to said first direction from said centerlines.

4. A tilt table in accordance with claim 3 and further including
   a pair of micrometer screws for imparting rolling motions to the outer endmost spheres located opposite said pivot end of said first and said third sets of spheres; and means for coordinating the operation of said pair of micrometer screws so that substantially identical rolling motions are imparted simultaneously to said outer endmost spheres.

5. A tilt table in accordance with claim 4 wherein said coordinating means includes a third micrometer screw mounted between said pair of micrometer screws;

a first gear peripherally mounted on said third micrometer screw;

a second gear peripherally mounted on one of said pair of micrometer screws;

a third gear peripherally mounted on the other of said pair of micrometer screws, said first, second and third gears thereby meshing so that rotation of said third micrometer screw causes rotations of said pair of micrometer screws whereby said substantially identical rolling portions are parted simultaneously to said outer endmost spheres.

6. A tilt table in accordance with claim 2 wherein the offset of said member centerline and the micrometer screw centerline is such that the rotation of the sphere produced by contact with said micrometer screw is the same as that required for its rolling translation along the race.

7. A device for providing translational displacement of a first movable member relative to a fixed member, said device comprising a first intermediate member pivotally connected to said fixed member;

a second intermediate member pivotally connected to said fixed member;

means for causing simultaneous angular displacement of said first intermediate movable member and said second intermediate movable member relative to said fixed member;

means for coupling said angular displacement motion of said first and second intermediate members to said movable member whereby said movable member is displaced in translation relative to said fixed member;

wherein said angular displacement causing means includes a first pair of races located in a surface of said fixed member, said races being laterally offset on either side of the centerline of said fixed member;

a second pair of races located in a surface of said first intermediate member, said second pair of races being disposed opposite said first pair of races and laterally offset on opposite sides of the centerline of said first intermediate member;

first and second sets of spheres positioned in one of said first pair of races and in one of said oppositely disposed second pair of races, respectively;

third and fourth sets of spheres positioned in the other of said first pair of races and in the other of said second pair of races, respectively; and means for imparting rolling motions to said first, second, third, and fourth sets of spheres whereby said first intermediate movable member is caused to move angularly with reference to said fixed member.

8. A device in accordance with claim 7 wherein said angular displacement causing means further includes a fifth race located in a surface of said fixed member substantially along the centerline thereof;

a sixth race located in surface of said second intermediate movable member substantially along the centerline thereof, said sixth race being oppositely disposed with reference to said fifth race;

fifth and sixth sets of spheres positioned in said fifth and sixth races, respectively; and means for imparting rolling motions to said fifth and sixth sets of spheres whereby said second intermediate movable member is moved angularly with respect to said fixed member simultaneously with the angular movement of said first intermediate movable member.

9. A device in accordance with claim 8 wherein said coupling means includes a seventh race located in another surface of said first intermediate movable member, said seventh race being substantially perpendicular to the centerline of said first intermediate movable member;

an eighth race located in another surface of said second intermediate movable member, said eighth race being substantially perpendicular to the centerline of said second intermediate movable member;

first and second rod means positioned within said seventh and eighth races, respectively, said movable member being positioned so as to rest on said first and second rod means whereby the angular displacement of said first and second intermediate movable members causes said movable member to be displaced in translation with respect to said fixed member.

10. A device for providing translational displacement of a movable member with reference to a fixed member, said device comprising an intermediate movable member pivotally connected at one end to said fixed member;

a first race located in a surface of said fixed member substantially along the centerline thereof;

a second race located in a surface of said intermediate member substantially along the centerline thereof and oppositely disposed with respect to said first race;

first and second sets of spheres positioned within said first and second races, respectively;

means for imparting rolling motions to said first and second sets of spheres whereby said intermediate member is angularly displaced with reference to said fixed member;

means for pivotally connecting said movable member to the other end of said intermediate movable member;

lever means coupling said movable member, said intermediate movable member, and said fixed member so that said movable member is angularly displaced with reference to said intermediate movable member when said intermediate movable member is angularly displaced with reference to said fixed member, or whereby said movable member is displaced in translation with reference to said fixed member.

11. A device for providing translational motion of a movable member with reference to a fixed member, said device comprising an intermediate movable member pivotally connected at one end to said fixed member;

a first race located in a surface of said fixed member substantially along the centerline thereof;

a second race located in a surface of said intermediate movable member substantially along the centerline thereof and oppositely disposed with reference to said first race;

first and second sets of spheres positioned in said first and second races, respectively;

means for imparting rolling motions to said first and second sets of spheres whereby said intermediate member is angularly displaced with reference to said fixed member;

means for pivotally connecting said movable member to the other end of said intermediate movable member;

a third race located in another surface of said intermediate movable member substantially along the centerline thereof;

a fourth race located in a surface of said movable member substantially along the centerline thereof and oppositely disposed with reference to said third race;

third and fourth sets of spheres positioned in said third and fourth races, respectively;

means for imparting rolling motions to said third and fourth sets of spheres whereby said movable member is angularly displaced with reference to said intermediate member; and means for coordinating the imparting of rolling motions to said first and second sets of spheres with the imparting of rolling motions to said third and fourth sets of spheres, or whereby said movable member is caused to move in translation with reference to said fixed member.